(12) United States Patent
Dara

(10) Patent No.: US 11,796,059 B2
(45) Date of Patent: Oct. 24, 2023

(54) SELF-CENTERING INSERT AND RELATED METHOD OF USE

(71) Applicant: Sogefi Air & Cooling USA, Inc., Rochester Hills, MI (US)

(72) Inventor: Steven Dara, Rochester Hills, MI (US)

(73) Assignee: Sogefi Air & Cooling USA, Inc., Rochester Hills, MI (US)

( * ) Notice: Subject to any disclaimer, the term of this patent is extended or adjusted under 35 U.S.C. 154(b) by 372 days.

(21) Appl. No.: 17/341,760

(22) Filed: Jun. 8, 2021

(65) Prior Publication Data

US 2022/0390013 A1 Dec. 8, 2022

(51) Int. Cl.
*F16J 15/06* (2006.01)
*F16L 19/065* (2006.01)

(52) U.S. Cl.
CPC .......... *F16J 15/061* (2013.01); *F16L 19/065* (2013.01)

(58) Field of Classification Search
CPC .......... F16J 15/06; F16J 15/061; F16J 15/062; F16L 19/065
See application file for complete search history.

(56) References Cited

U.S. PATENT DOCUMENTS

2004/0074887 A1    4/2004  Matiash et al.

FOREIGN PATENT DOCUMENTS

| CA | 1327380    | 3/1994 |
| CA | 2784611 A1 | 6/2011 |
| EP | 4177499 A1 * | 5/2023 |
| GB | 2270142 A  | 3/1994 |

* cited by examiner

*Primary Examiner* — Gilbert Y Lee
(74) *Attorney, Agent, or Firm* — Warner Norcross + Judd LLP

(57) ABSTRACT

A method of installing an insert in a body is provided, including advancing an insert into a bore of the body bounded by a lip so that a round seal of the insert passes the lip with a clearance therebetween, and so the insert first engages the body with a contact rim rather than the round seal. Accordingly, the round seal is not compromised to self-center the insert in the bore. The bore can include a shoulder distal from the lip. The round seal, which optionally can be an O-ring, can sealingly engage the shoulder and a secondary bore after the insert is self-centered in the bore. The round seal can be advanced farther into the body so another contact rim engages the shoulder. The insert can be heated so components of the body melt and fuse to parts of the insert during installation. A related system is provided.

20 Claims, 7 Drawing Sheets

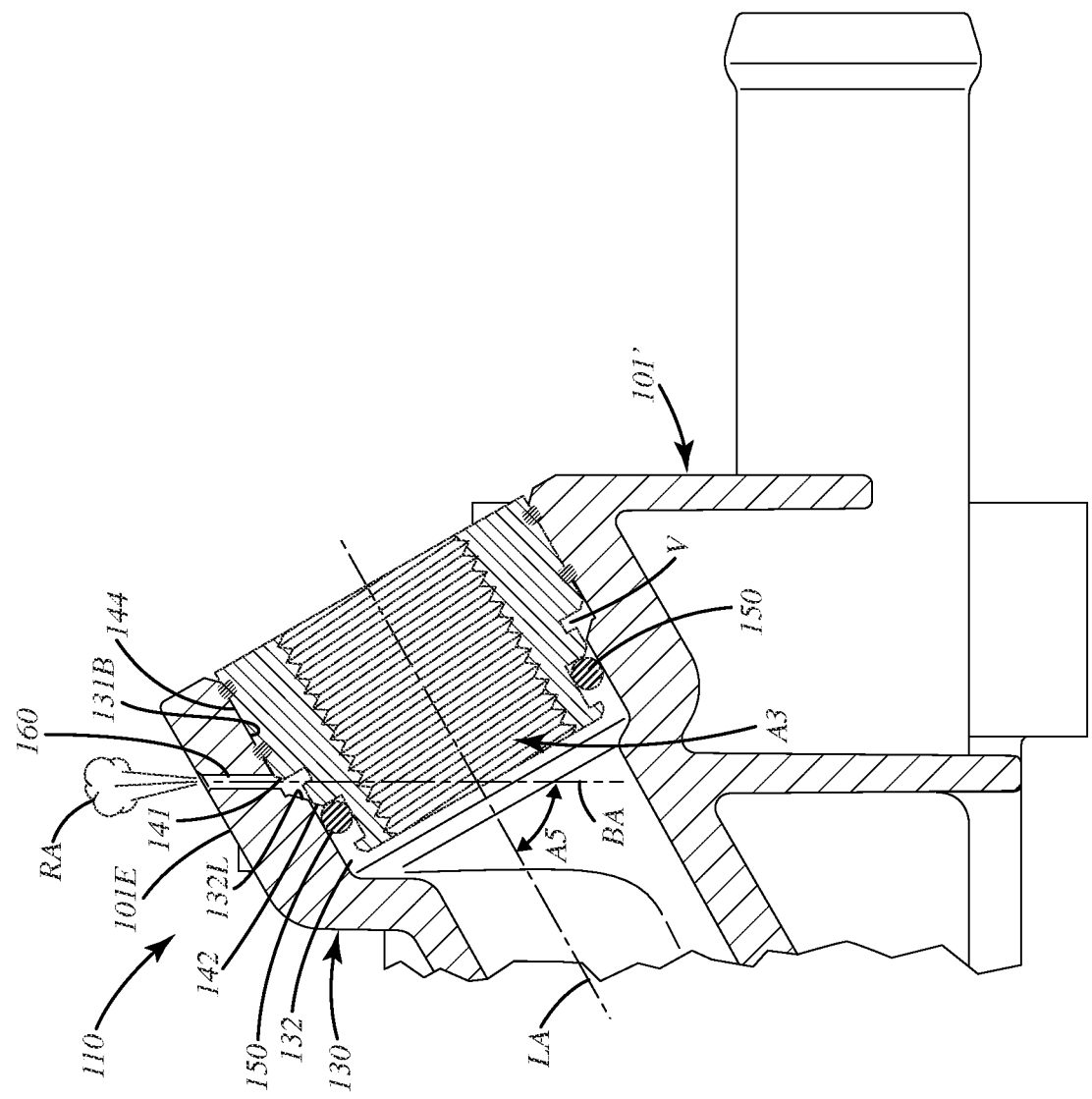

SELF-CENTERING INSERT AND RELATED METHOD OF USE

BACKGROUND OF THE INVENTION

The present invention relates to inserts that installed in a body, and more particularly to a self-centering insert that preserves the integrity of an associated seal when installed in an opening of the body.

In a variety of applications, metal inserts are embedded or included in polymeric parts to allow other metal parts to be rigidly and securely joined with the polymeric part via direct engagement between the metal part and the metal insert. In turn, this can provide a secure metal to metal connection between the parts, offering improved strength, durability and longevity at that connection. For example, in certain high temperature and/or high pressure environments, metal inserts are frequently included in resin bodies. As a more particular example, some oil filter assemblies can include a brass insert that is disposed in an opening of a resin body to facilitate attachment of another metal part to the resin body via the brass insert.

Typically, metal inserts of this kind include an O-ring that interfaces with an interior of an opening of the resin body to provide a seal around the insert. A frequent issue with these O-rings, however, is that upon assembly, when the insert is placed in the opening, if it is not perfectly aligned with the opening, the resin body or insert can engage and tear or otherwise damage the O-ring. In turn, this can result in a damaged seal that can cause leaks in the system. For example, as shown in FIG. 1, a conventional insert 1 having an O-ring 2 is placed in an opening 3 of a resin body 4. The insert 1 centers or aligns with the opening by making first contact between the resin body and the O-ring as shown. When the insert is misaligned as shown, the O-ring 2 engages the rim or other parts of the opening 3 to center the remainder of the insert 1 in the opening 3. The resultant forces SF applied by both the resin body 4 and the insert 1 on the O-ring 2, can shear, damage and/or tear the O-ring 2, as shown at the resulting defect 6 in FIG. 2. Nothing prevents the O-ring misalignment, and the entirety of the centering function relies on the contact between the O-ring and the body. This results in the high potential of the O-ring being damaged if any misalignment between the insert and the body exists, whether due to the insertion process or due to the geometry of the mated parts. Again, where the misalignment occurs, the O-ring can be pinched and damaged during the insertion stroke to produce a cut or other defect 6 in the O-ring, which ultimately can lead to leaks in the system.

Present attempts to better center the inserts in the openings, and prevent misalignment, focus on precise adjustments to, and set up of, the associated assembly equipment. This, however, results in added costs in capital and hours for those adjustments.

In general, the above misalignment issues with regard to assembling inserts with resin bodies can cause defective products, additional maintenance time for the assembling equipment and a higher frequency of in-process, weekly quality tests. Accordingly, there remains room for improvement to address the issue of seals, such as O-rings, becoming damaged in the process of installing an insert relative to a body due to the misalignment of the insert and the body.

SUMMARY OF THE INVENTION

A method of installing an insert in a body and a related system are provided to enable a round seal of the insert to float safely within a bore until the insert is centered in the bore via contact between a contact rim and the body. This can ensure that the round seal, for example, an O-ring, is centered before it is compressed into its final sealing geometry inside the body.

In one embodiment, the method can include advancing the insert into a bore of the body bounded by a lip so that a round seal of the insert passes the lip with a clearance therebetween, and so the insert first engages the body with a contact rim rather than the round seal. When the round seal is not so engaged, the round seal is not compromised to self-center the insert in the bore.

In another embodiment, the bore can include a shoulder distal from the lip. The round seal, which again optionally can be an O-ring, can sealingly engage the shoulder and a secondary bore after the insert is self-centered in the bore. The O-ring can be advanced farther into the body so another contact rim engages the shoulder.

In still another embodiment, the insert can be heated so components of the body melt and fuse to parts of the insert during installation. For example, the insert can be heated to at least 200° F. When the insert first contacts the body with the contact rim, it can melt part of the bore and in particular part of the lip and part of a first bore wall that bounds the bore. The contact rim can be farther advanced into the bore, and in so doing, can melt more of the bore wall. When the insert and contact rim are sufficiently advanced into the bore, the insert and/or body can cool, and the melted material of the body can fuse to the insert.

In yet another embodiment, the insert can be metal and the body can be polymeric. The heated metal of the insert can engage and melt the polymeric material of the body. With heat and/or pressure, the insert can be advanced into the bore, without placing stresses or forces on the O-ring until after the insert is properly aligned with the bore.

In even another embodiment, the method can include advancing the insert into the bore farther so that the O-ring contacts another bore wall inside the body. Upon such contact, the O-ring can slide along the other bore wall, compressing such that the O-ring seals against the bore wall.

In a further embodiment, the method can include advancing the insert into a first bore far enough so that the round seal enters a second bore that is contiguous with the first bore. The first bore can have a first bore diameter. The second bore can have a second bore diameter. The round seal can be an O-ring. The second bore diameter can be less than the O-ring major diameter and/or the first bore diameter. The O-ring can seal against a bore wall of the second bore.

In still a further embodiment, the second bore can transition to the first bore at a second lip. The O-ring can engage the second lip after the first engagement of the first contact rim and the first bore and/or first lip self-centers the insert within the first bore. In this manner, the O-ring is not damaged by the engagement of the O-ring with the second lip and/or the second bore wall because it is already centered relative to those components of the body.

In yet a further embodiment, a sealed system configured to convey fluid is provided. The system can include an insert defining an insert bore, a first end, a first contact rim, and a second end distal from the first end. The insert bore can extend through the insert from the first end to the second end to define a first passageway through the insert. The insert can be encircled by a round seal, for example, an O-ring having an O-ring major diameter. The round seal can be located between the first end and the second contact rim. The insert can include an insert axis.

In even a further embodiment, the system can include a body defining a first bore bounded by a first lip transitioning to a first bore wall. The first bore can include a first bore diameter and a bore axis. The body can define a second bore diameter distal from the first bore diameter. The second bore diameter can be less than the first bore diameter and less than the O-ring major diameter. The body can include a second passageway.

In another embodiment, the insert can be installed in the body such that the first passageway is in fluid communication with the second passageway.

In still another embodiment, the insert can be installed in the body such that the O-ring engages a second bore wall at the second bore diameter to form a seal between the second bore wall and the insert.

In yet another embodiment, the insert can be installed in the body such that the first end is adjacent the second bore wall, but separated by a clearance from the second bore wall.

In even another embodiment, the insert can be self-centered within the first bore so that the insert axis and the bore axis are aligned, and without contacting the O-ring with components of the body in a manner that would compromise the integrity of the O-ring.

In a further embodiment, the self-centering insert can provide a sensor mount in an oil filter assembly so that a sensor can be mounted to the body via the insert. The system can be used in high temperature and/or high pressure environments, particularly those that rely on an O-ring seal and that are hot inserted into a resin body opening.

The current embodiments provide a method and system to promote self-centering of an insert in a bore of a body without damaging a seal of the insert located between the body and the insert. The self-centering nature of the design ensures that the first contact made between moving parts during its installation is the insert itself and the resin body, while the seal floats safely within an oversized opening. Further, where a hot insertion process is used to install the insert relative to the body, once the insert is centered within the resin body's opening, the round seal, which can be in the form of an O-ring, can provide a uniform 360° contact with a tapered region of the opening where the seal is compressed into its final sealing geometry. In some applications, where the insert's travel is at its end, the O-ring can seal between a bore wall of the body and a sealing region along the insert.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 9 is a section view of a first alternative embodiment of the self-centering insert including an alternative relief passageway.

DETAILED DESCRIPTION OF THE CURRENT EMBODIMENTS

Figure 1:
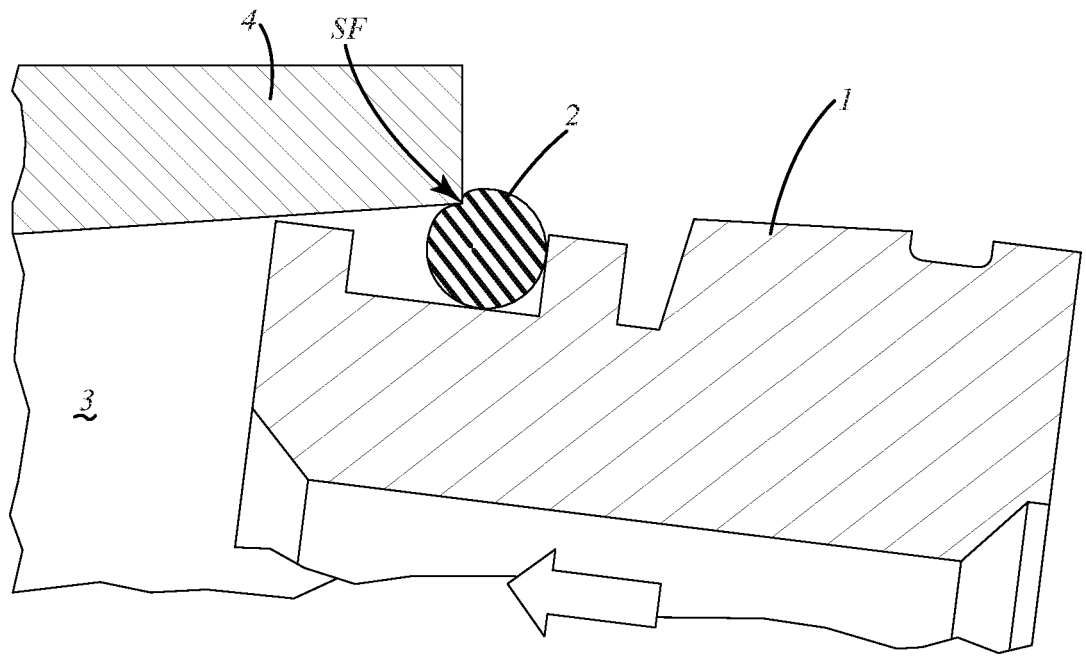
FIG. 1 is a section view of a prior art insert with a seal.
Figure 2:
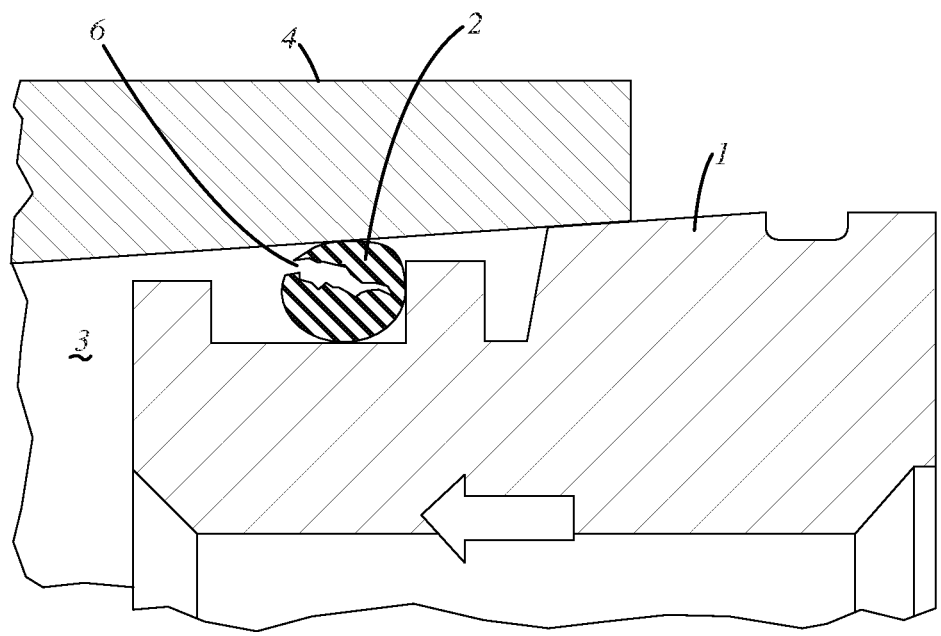
FIG. 2 is another section view of the prior art insert with a seal.

A current embodiment of a sealed system to convey fluid is shown in FIGS. 3-8 and generally designated 10. The system 10 can include an insert 20 and a body 30. The insert can be sealingly engaged with the body 30 via a seal 50, so that fluid can flow through a first passageway 20P of the insert 20 and the second passageway 30P of the body as shown for example in FIG. 8. In the application shown there, the insert and body can establish fluid communication between an oil filter assembly 101 and a sensor 102. The oil filter assembly and sensor can be joined with an engine, which optionally can be an internal combustion engine, such as a gasoline or diesel engine. Of course, the sealed system 10 is well suited for other applications, such as hydraulic systems, pneumatic systems, and the like where an insert can be installed relative to a body to provide a solid, secure and sealed connection between the body and another part. Optionally, the insert and the second part can be constructed wholly or partially from metals, while the body can be constructed from a polymer, a resin and/or a composite material. The interface between the second or added part, such as the sensor 102, and the body 30 can be strengthened and improved via the insert 20. In these applications, the metal insert also can have a much higher melting temperature than the body such that the insert can be heated as described below and hot inserted into the body to cause a portion of the body that contacts the insert to melt, and subsequently cure and fuse to the insert to establish a good connection between the elements.

Figure 3:
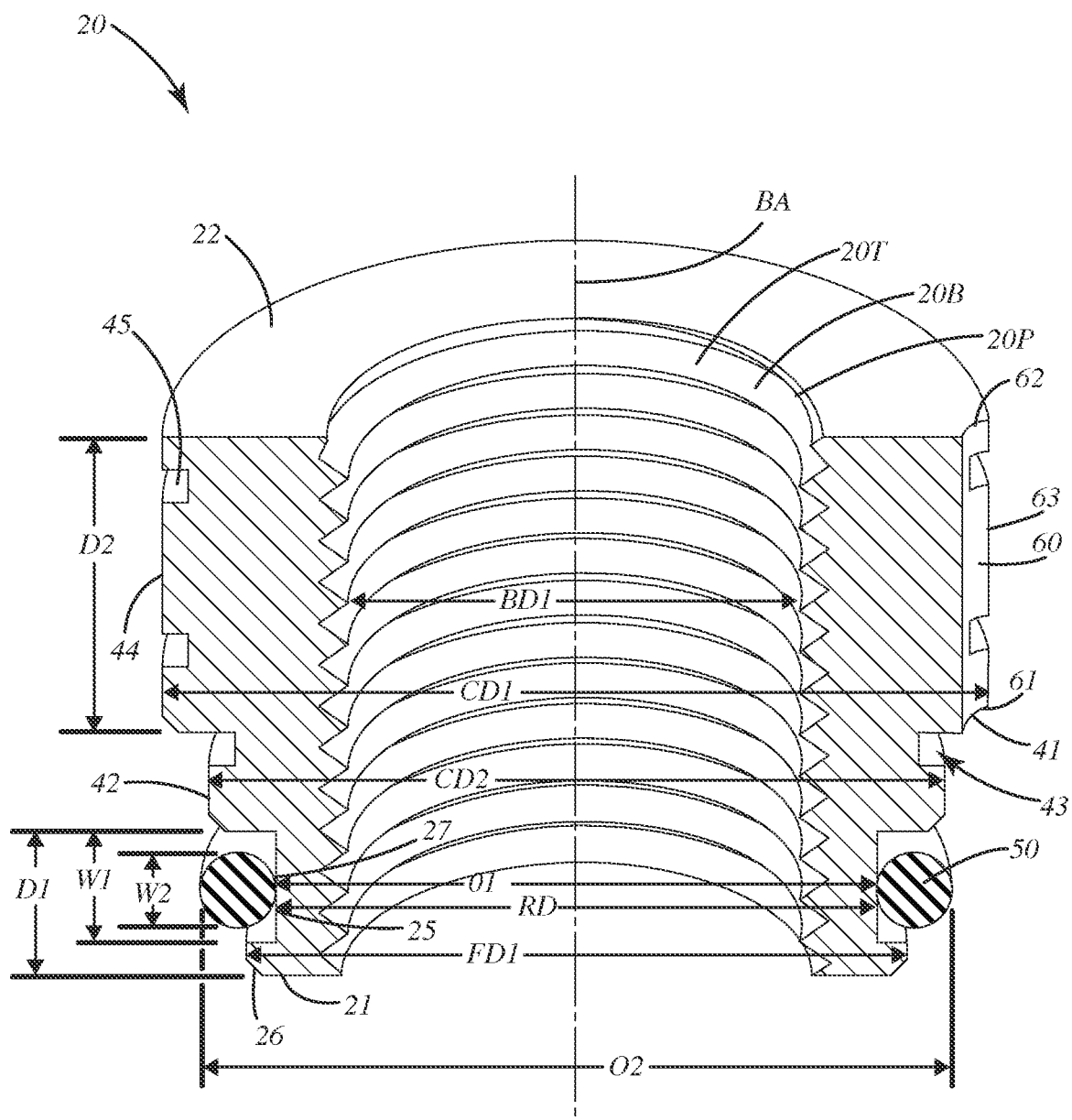
FIG. 3 is a bottom perspective view of the self-centering insert with a seal of a current embodiment.
Figure 8:
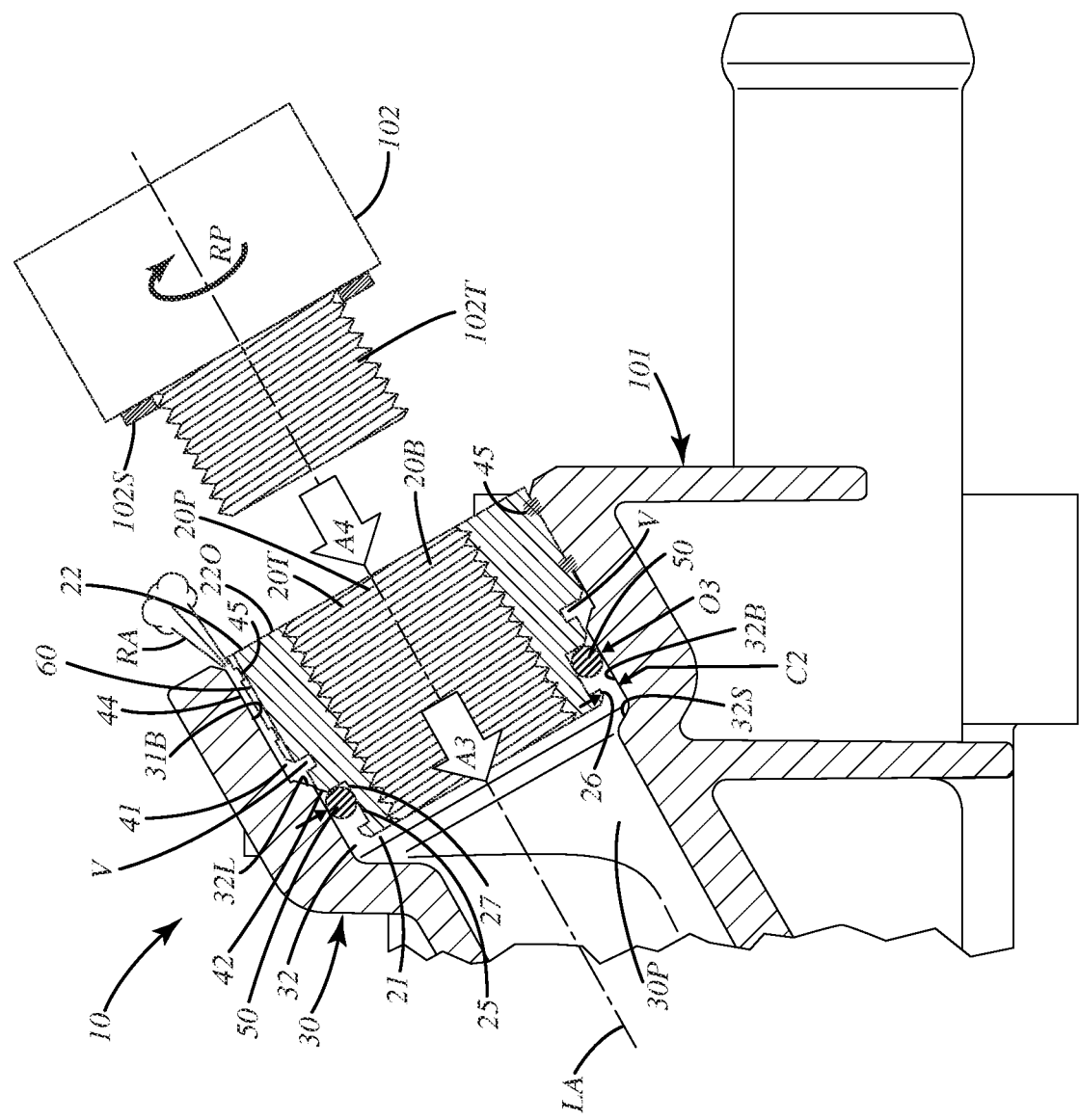
FIG. 8 is a section view of the self-centering insert with the seal fully installed in the body and the seal sealingly engaging a second bore of the body.

Turning now to FIG. 3, the insert 20 and its components will now be described in further detail. The insert 20 can include a first end 21 and a second end 22. The insert optionally can be in the form of a tubular structure defining a first passageway 20P therein. This first passageway can correspond to and form an insert bore 20B extending from the first end 21 to the second end 22. The first bore 20B optionally can include threads 20T which can threadably engage corresponding threads 102T on a second part 102 as shown in FIG. 8. The insert bore 20B can extend through the insert, from the first to the second end. The insert bore 20B and the first passageway 20P can include an insert bore diameter BD1. Optionally, although not shown, the insert can include a valve, reduction or obstruction where the bore 20B is located. Where the insert is solid and defines no bore, the insert can function as a plug.

With reference to FIG. 3, the insert 20 can include a first contact rim 41 and a second contact rim 42 distal from the first contact rim. The second contact rim 42 can be closer to the first end 21 than the first contact rim 41. Likewise, the second contact rim 42 can be farther from the second end 22 than the first contact rim 41. Each of these respective contact rims 41 and 42 can form annular rings, shoulders or surfaces around the insert axis BA which can be generally coincident with the center of the bore 20B and the first passageway 20P. The first contact rim 41 can be separated from the second contact rim 42 via a separation groove 43. The separation groove 43 can be configured to collect and capture melted and/or molten material from the body, during a hot insertion process as described below. This molten material can cure in the groove and form an interlock between the body and the insert so as to better secure the insert within the body.

As further shown in FIG. 3, the diameter of the insert at the first contact rim 41, which can be in the form of an annular surface and can circumferentiate the insert axis BA can form a first contact rim diameter CD1. The second contact rim 42 also can form an annular surface and can circumferentiate the insert axis BA, forming a second contact rim diameter CD2. The second contact rim diameter CD2 can be less than the first contact diameter CD1. In some applications, the difference between these diameters can be at least 1 mm, at least 2 mm, at least 3 mm, at least 4 mm, at least 5 mm, at least 6 mm, at least 7 mm or more.

Optionally, the first contact rim 41 can be separated from the second end 22 by a second distance D2, while the second contact rim 42 can be separated from the first end 21 by a first distance D1. The second distance D2 can be greater than the first distance D1. The insert 20 can include a first exterior 44 along the second distance D2. This first exterior 44 can include ridges, projections, knurls, indentations or recesses (all referred to as contours) 45 therein. These contours can provide greater surface area for the material of the body to interface with the insert and interlock the components relative to one another. Further, where the insert is heated and hot inserted into the body, and the body is polymeric, portions of the body can melt and fill in the contours 45, cure and fuse to those surfaces, forming a solid bond between the body and the insert. The exterior surface 44 can be textured or contoured in a variety of manners to enhance the fusing and/or bonding of the material of the body 30 to the insert 20.

As mentioned above, the insert 20 can include the first end. This first end can be the part of the insert that is first inserted into the body and its bore. The first end 21 can include a capture recess 25 that is generally defined between the second contact rim 42 and the flange 26 that projects outwardly from a bottom wall 27 of the capture recess 25. The flange 26 can form an annular ring and can include diameter FD1. This flanged diameter FD1 can be greater than a diameter RD of the insert that corresponds to the bottom 27 of the recess 25. The recess diameter RD also can be less than the second contact rim diameter CD2 and the first contact rim diameter CD1. The recess diameter RD further can be slightly greater than, equal to, or less than the minor diameter O1 of the seal 50 mounted to the insert 20.

In addition to the minor diameter O1, the seal 50 can include a major diameter O2. The seal 50 as shown can be in the form of an O-ring. The O-ring optionally can be an elastomeric O-ring constructed from natural or synthetic rubber, silicone, polymers, or other elastomeric, flexible and/or resilient materials. As used herein, an O-ring can refer to any conventional type O-ring, as well as any other type of round seal, or annular seal of a ring like configuration, which optionally can have a circular, elliptical, polygonal, angular or other cross section, thickness, width or diameters. Generally, the O-ring can extend around the insert and optionally surround the axis BA.

Where the minor diameter O1 is less than the recess diameter RD, when the O-ring is stretched or expanded from an initial relaxed, unstretched state, the O-ring subsequently can be placed over the insert, extending and moving over the flange 26, to come to rest in the recess 25. When it does so, the O-ring can be slightly stretched or tensioned radially outward from its center. In this state, the O-ring can clampingly engage around the insert and the bottom wall 27 of the recess 25. In addition to the tension around the insert holding it in place, the O-ring can be trapped between the flange 26 and the contact rim 42, within the recess 25.

Optionally, the recess 25, in particular the bottom wall 27, can have a width W1 that is greater than a width W2, which corresponds to the thickness of the O-ring from an upper surface to a lower surface of the O-ring. In this manner, the O-ring can roll and/or slide within the recess, between the flange 26 and the second contact rim 42 when being installed in a bore of the body as described below. With this construction, the O-ring has some give and can move around to seat and seal against the bore wall of the bore of the body. It also can expand and change from a generally circular cross section to an elliptical cross section, optionally filling in the portions of the recess, and sealing under compression between the bore wall 32B and the bottom wall 27 of the insert, generally within the recess 25. In the compressed state, the O-ring cross section also can change and/or deform to the shape of the recess 25.

Figure 6:
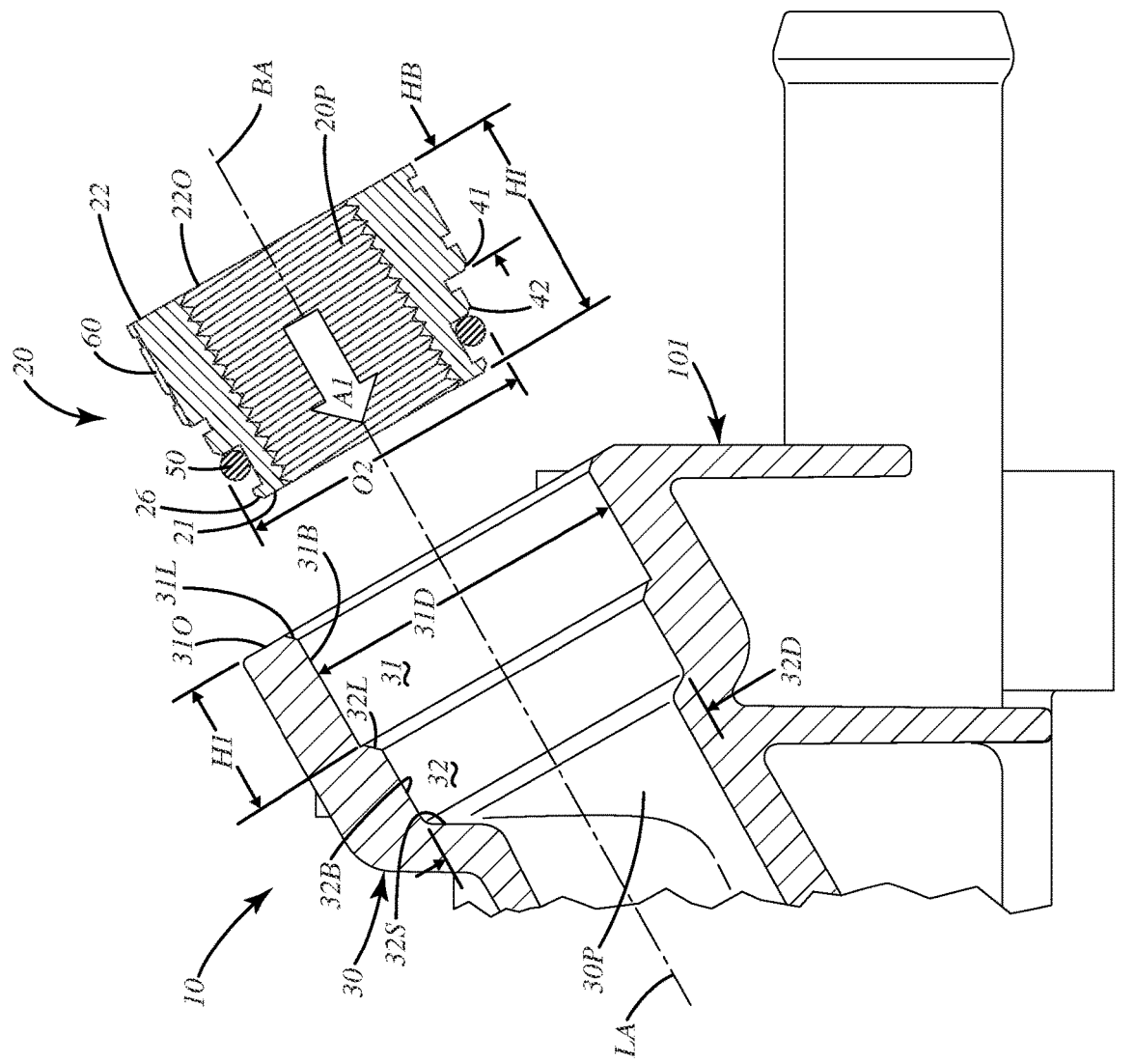
FIG. 6 is a section view of the self-centering insert with a seal of a current embodiment before installation in a body.

Turning now to FIG. 6, the body 30 will be described in more detail. To begin, the body 30 can be a component in a larger system, for example, an oil filter assembly of an engine. Of course, the body 30 can be incorporated into a variety of other types of devices, equipment, machines or assemblies in other applications. The body 30 can define a passageway 30P as described above. This passageway 30P can be in fluid communication with the passageway 20P of the insert 20. The passageway 30P can be fluid communication with a first bore 31 and a second bore 32 defined by the body 30. As illustrated, the first bore 31 can be of a cylindrical shape. The second bore 32 also can be of a cylindrical shape, and can transition to the first bore 31 as well as the passageway 30P. The first bore 31 can include a first bore diameter 31D and the second bore 32 can include a second bore diameter 32D. Although shown as separate bores, separated by a transition, shoulder and/or second lip (all referred to as a lip) 32L, the first bore 31 and second bore 32 can be contiguous and/or continuous to one another, generally forming a single, tapered bore which can have a slightly frustoconical configuration (not shown).

The first bore 31 and second bore 32 shown in FIG. 6 include a first bore diameter 31D that is greater than the second bore diameter 32D. The first bore diameter 31D also can be greater than the major diameter O2 of the O-ring 50 when the O-ring is installed relative to the insert 20. With this construction, as described below, a clearance C1 can be established between the outermost surfaces of the O-ring as the O-ring is initially installed relative to the first bore 31 and the body 30 generally. This can allow the O-ring to float safely within the first bore as the insert is installed.

The first bore 31 and second bore 32 can include a bore axis LA. This bore axis LA can be parallel to, aligned with and coincident with the insert axis BA when the insert 20 is properly aligned and self-centered in the bore 31 and relative to the body 30. Further, each of the respective diameters described in connection with the first bore and the second bore can pass through this bore axis LA. Optionally, the various bore walls of the bores can circumferentiate this bore axis LA.

As further shown in FIG. 6, the first bore 31 can be bounded by a first lip 31L. This first lip 31L can be chamfered, rounded and/or angled inward toward the first bore 31. This lip 31L can transition to an outer surface 31O at an outermost portion of the body. This outer surface 31O can extend radially outward away from the bore axis LA and form a land or other surface around the bore 31. The configuration and contour of this outer or exterior surface 31O can vary depending on the insert and the part 102 to be joined with the body 30 via the insert 20.

The lip 31L can extend circumferentially around the bore axis LA. The lip 31L can transition to a first bore sidewall 31B that extends inward, away from the outer surface 31O and the lip 31L. This first bore sidewall 31B optionally can be cylindrical such that the bore and body form a generally tubular shape. The first bore sidewall 31B can extend from the first lip 31L to a second lip 32L which itself can transition to the second bore 32. The first bore sidewall 31B can have a height H1. This height H1 can be less than the diameter 31D of the first bore 31 and less than the diameter 32D of the second bore 32. It also can be less than the overall height HI of the insert 20. This height H1, however, can be greater than the height HB of the insert extending from the second end 22 to the first contact rim 41. Optionally, this can allow the insert to fully seat within the body so that the outer surface 20O of the insert 20 is flush with the outer surface 31O of the body and/or in some cases insets relative to that outer surface 30O.

The second lip 32L can transition to a second bore sidewall 32B of the second bore 32. The second bore sidewall 32B can transition to a lower shoulder 32S of the second bore 32 which itself further transitions to the second passageway 30P of the body 30. The second bore diameter 32D as mentioned above can be less than the first contact rim diameter CD1 of the insert 20. With this difference, the contact rim 41 can engage and interfere with the second contact lip 32L when the insert 20 is installed in the body 30 as described below. The second bore wall 32B can be cylindrical as shown, optionally forming a tubular structure within the body. As mentioned above, although shown as separated by a second lip or shoulder 32L, the second bore sidewall 32B can be contiguous with the first bore sidewall 31B to form an inwardly tapering bore as the bore extends away from the first contact lip 31L. It will be appreciated that either or both bores 31 and 32 can have the generally cylindrical or slightly tapered shape as shown, however, these bores can have other cross-sectional shapes, such as polygonal shapes, elliptical shapes, round shapes or other shapes depending on the application and corresponding shape of the insert 20 installed relative to the body 30.

Optionally, in some applications, the insert 10 can be outfitted with a relief passageway 60 that can enable trapped and/or pressurized gas, for example air, to escape from the void or volume between the O-ring 50 and the first lip 41 when the insert is being installed relative to the body 30. It was surprisingly and unexpectedly discovered that as the insert 20 is installed relative to the body, for example, as shown in FIG. 8, gas can be entrapped and excess pressure can sometimes build up in the void V between the O-ring 50 and the first lip 41, when or as the body is melting, fusing or bonding to the first exterior 44 and/or contours 45. More particularly, gas can be trapped between the O-ring 50, sealing between the second bore lip 32L and the insert bottom wall 27, and the molten material, sealing between the first bore 31 and the insert contours 45. It is surmised that this occurs due to the void V being sealed at both ends, that is, via the O-ring 50 and via the bonded or sealed exterior 44 to the bore 31B. As the insert is further advanced into the bore 32 in direction A3, the gas in the void is compressed, and thereby increases in pressure. This entrapped gas and increased pressure can push or urge the O-ring 50 away from the lip 42 within the recess 25, and in some cases, can push, urge or extrude the O-ring 50 past the flange 26, through the clearance C2 as described below. In turn, this can negate the sealing effect of the O-ring.

To address the above potential movement of the O-ring during installation of the insert, a relief passageway or recess can be included in the insert and/or body, depending on the application. As shown in FIGS. 3-5 and 8, the insert 20 can include a relief passageway 60, which optionally can be longitudinally disposed on the first exterior 44 of the insert 20. The relief passageway 60 can be in the form of a recess, which can mean a groove, a channel, a hole, a passage, a bore, an opening and/or an orifice. The recess can include a first end 61 and an opposing second end 62. The first end 61 can be coterminous with and extend through or to the first lip 41. The recess can include a central portion 63 that extends from the first end 61 to the second end 62. This central portion 63 can run through or along the first exterior 44 and any included contours 45 to the second end. The second end 62 can be coterminous with and extend though or to the second end 22 and/or the outer surface 20O of the insert. The relief passageway thus can extend from the void V shown in FIG. 8 to the outer surface 22O, or more generally the environment external to the insert 20 and body 30. This passageway can thereby allow gas RA that is pressurized as described above to escape through it to the environment shown in FIG. 8 to inhibit the O-ring from being dislodged, moved or poorly positioned when pressure tries to build in the void.

Figure 4:
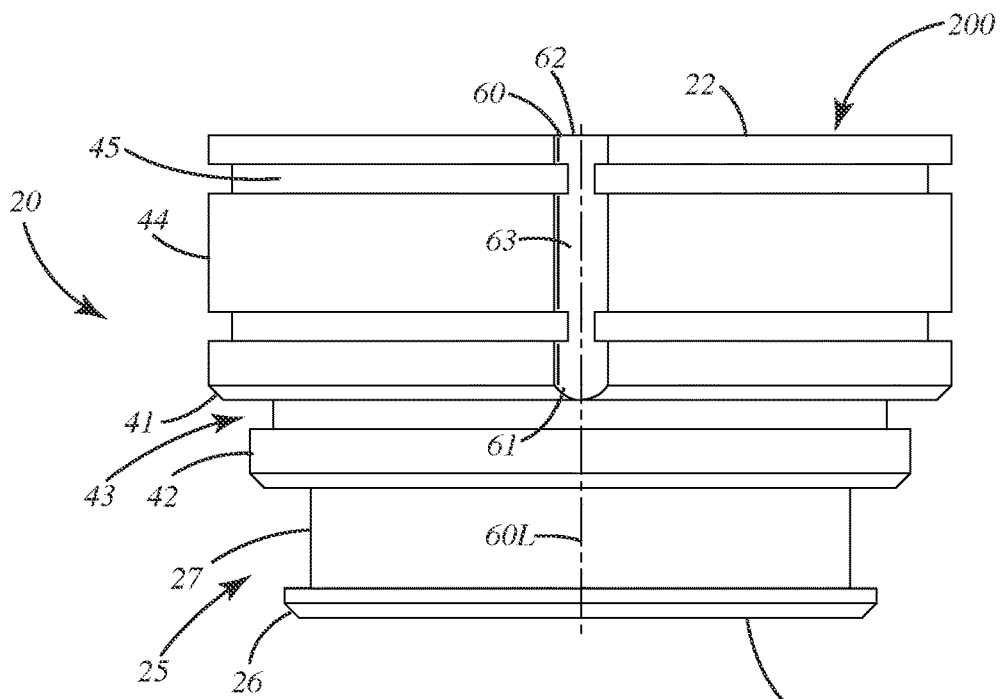
FIG. 4 is a side view thereof.
Figure 5:
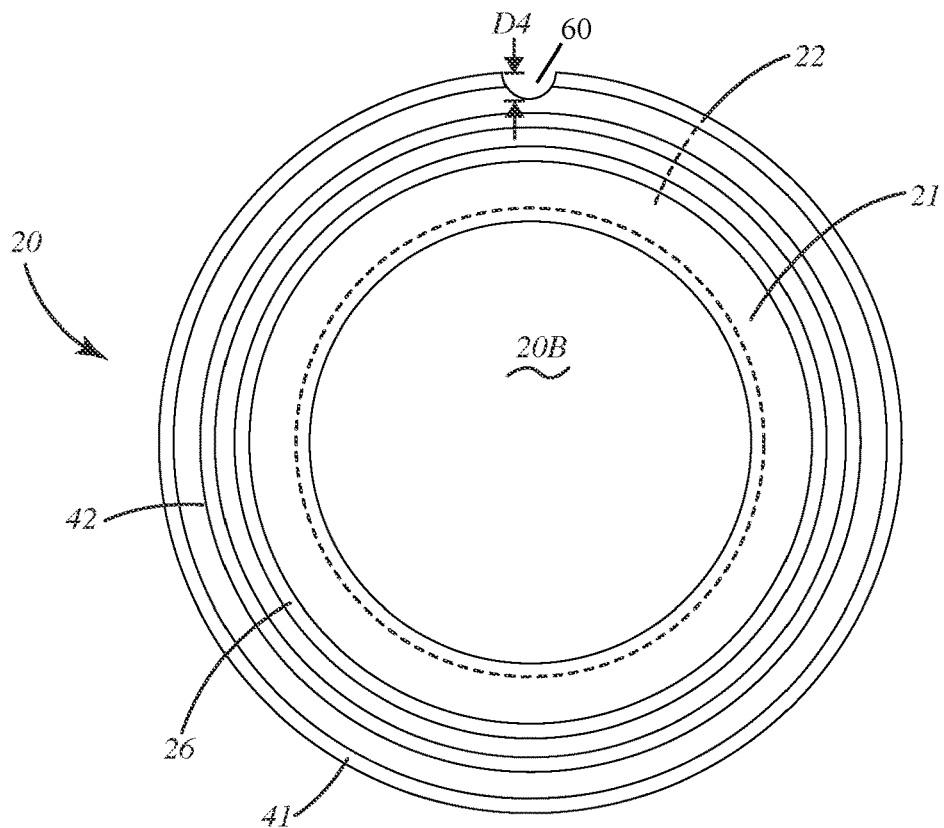
FIG. 5 is a bottom view thereof.

The passageway 60 shown in FIGS. 3-4 can be of a rounded or partially circular cross section. In other applications, the cross section can be triangular, rectangular, polygonal or other shapes. Further, although shown as extending along the exterior surface 44, that passageway can be a bore extending through the insert from the first lip to the outer surface 20O. The recess also can include a recess axis 60L that is optionally parallel to the longitudinal axis LA of the insert 20. In other applications, the recess axis 60L might be transverse or offset relative to that axis LA. Further optionally, as shown, the passageway or recess 60 can include a depth D4 that extends inward from the exterior surface 44 when the recess is disposed at or near that surface. This depth D4 can be optionally at least 0.1 mm to 2 mm, inclusive, 0.1 mm to 1 mm, inclusive, 0.1 mm to 0.5 mm, inclusive or other depths, depending on the application. Where the recess is a bore or hole, the diameter or dimension of the same can be similar to the aforementioned values.

The passageway 60 can again be disposed in the exterior surface 44 for example along the contours 45 if included. Where the insert 20 is heated upon installation of the insert in the body as described below, sometimes, melted portions of the body might enter the passageway and obstruct a small portion of it, yet still allow the passageway to vent excess gas from the void. The dimension of the recess or passageway can be slightly oversized to accommodate this potential, partial obstruction.

As mentioned above, the passageway can be formed in the body rather than the insert. For example, as shown in an alternative embodiment in FIG. 9, the passageway or recess 160 can be defined in the body 130, connecting the first bore 131, at a location very near the second lip 132L, to the environment outside the system 110 and assembly 101'. When gas is entrapped in the void V, it can be vented or escape through the passageway 160. In turn, this can prevent the O-ring 150 from being dislodged or removed from the insert to negate its sealing effect. As illustrated, the passageway can open from the bore 131B to the exterior surface 101E of the body 130. The passageway can be a recess having a dimension similar to D4 mentioned above. The recess, however, can be in the form of a bore, optionally cylindrical and/or tubular. The recess 160 can include an axis BA that is offset or transverse to the axis LA at an angle A5. This angle can be an acute angle, or perpendicular to the axis LA, depending on the configuration of and placement of the recess. Other passageways and orientations of the same are contemplated to provide gas escapement.

Figure 7:
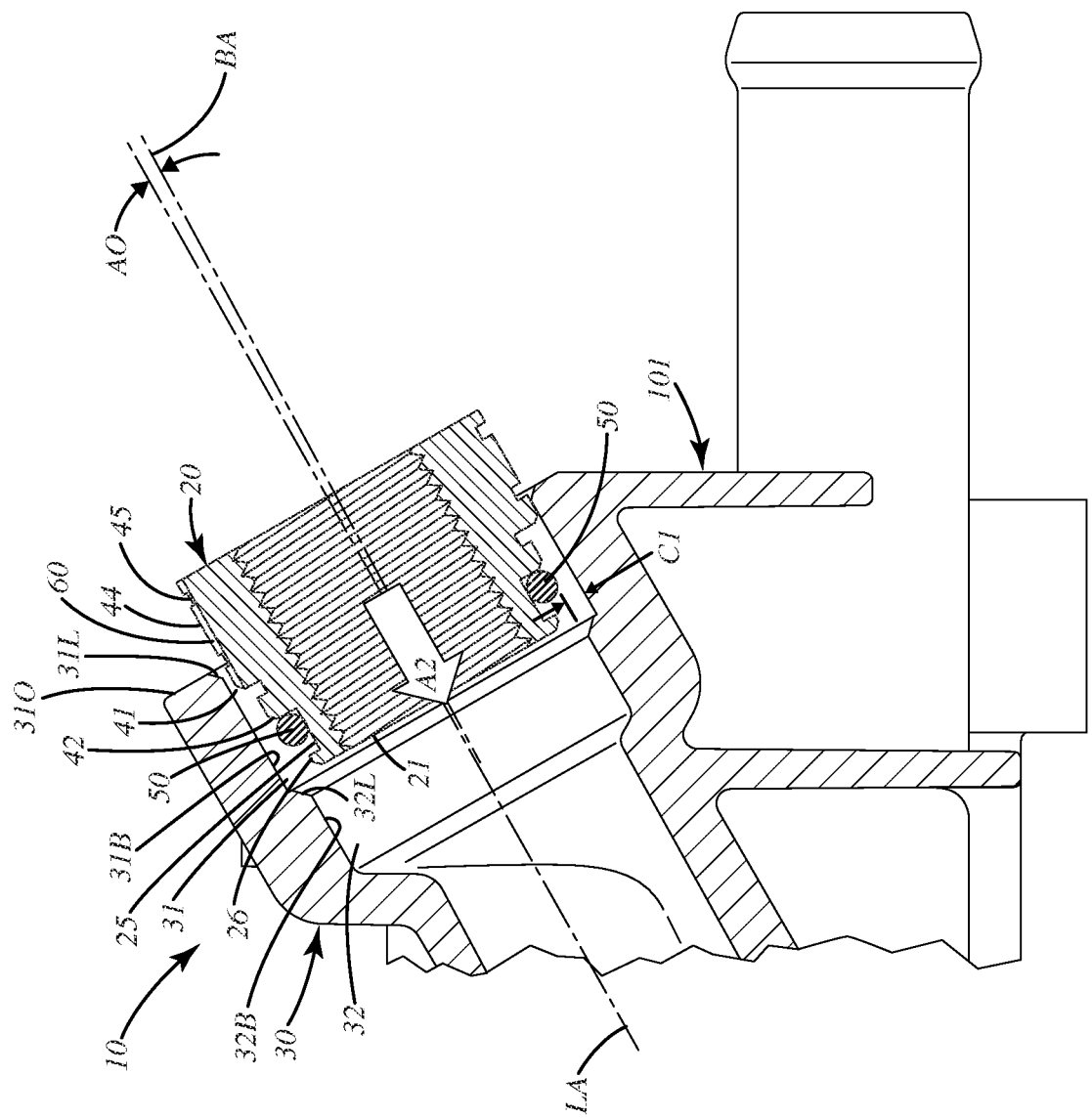
FIG. 7 is a section view of the self-centering insert with the seal upon first contact with the body to self-center the insert in a first bore of the body.

A method of installing the insert 20 relative to the body 30 will now be described with reference to FIGS. 6-8. As shown in FIG. 6, the body 30 can be held in a predetermined spatial orientation, for example, by a fixture (not shown) that supports the body 30 in a stationary position. The insert 20 can be held in a tool (not shown) capable of advancing the insert 20 toward the body 30 and in particular toward the first bore 31. The insert can be advanced toward the body and the first bore 31 such that the insert axis BA generally aligns with the bore axis LA. Due to imperfections in the parts, equipment, tool and/or the fixture, however, these axes can be slightly off relative to one another. Further, the insert 20 might not be perfectly orthogonally projected and/or advanced into the bore 31.

In the method, the insert 20 can be moved in direction A1 by the tool toward the body 30 held by the fixture so that the first end 21 moves toward the first bore 31 with the flange 26 generally aligned with the lip 31L and the first bore 31. This advancing continues as shown in FIG. 7, where the insert 20 has entered the first bore 31 and generally the body, moving in direction A2. As the insert 20 is so advanced, the first end 21 and the flange 26 enter the first bore 31, passing the first lip 31L. As this occurs, there may or may not be a slight offset of the insert axis BA from the bore axis LA. This is illustrated by the angular offset AO shown in FIG. 7 where these axes are slightly misaligned.

Even with this slight angular misalignment, or a different type of linear misalignment where the first end 21 is not perfectly aligned in the bore 31, the first end 21 and flange 26 can enter the bore 31. As this occurs, and the first end 21 extends deeper into the depth H1 of the bore 31, the O-ring 50 does not contact the first bore sidewall 31B or the lip 31L. Instead, there is and remains a clearance C1 generally around the O-ring 50 within the bore 31. This clearance C1 can be optionally at least 0.01 mm, at least 0.1 mm, at least 0.25 mm, at least 0.5 mm, at least 0.75 mm, at least 1.0 mm, at least 1.5 mm, at least 2.0 mm or more depending on the application, the size of the insert in the size of the bore and O-ring. This clearance can be measured from the maximum diameter O2 of the O-ring to the first bore diameter 31B. For example, the clearance can be calculated by subtracting the maximum O-ring diameter, when the O-ring is installed on the insert, from the first bore diameter 31D. Depending on the centering of the insert and O-ring within the bore 31, the clearance C1 in one portion of the bore adjacent the O-ring can be different from the clearance C1 in another portion of the bore adjacent the O-ring at a distal location. Generally, however, the clearance C1 is maintained, and the O-ring does not contact the bore sidewall 31B.

Optionally, before the O-ring is disposed within the bore and adjacent the first bore sidewall 31B, a similar clearance is established between the O-ring 50 and its major diameter, and the first lip 31L of the body 30. In this manner, the O-ring 50 does not contact the lip 31L and does not assist in any alignment, self-centering of the insert in the bore, or adjustment of the insert axis BA relative to the bore axis LA. It does not do so because the O-ring does not contact or engage the lip 31, or the first bore sidewall 31B to exert any force on the insert as it advances in direction A2 into the first bore 31.

As mentioned above, the installation of the insert 20 relative to the body 30 and the first bore 31 in particular continues without the seal 50 engaging the bore sidewall 31B. In this manner, the seal floats inside the first bore 31 without the first bore sidewall 31B exerting any forces on the seal 50. The first lip 31L also does not exert any forces on the seal 50 nor engage the seal. As advancement in direction A2 continues, the first contact rim 41 engages one or more of the first lip 31L, the first bore 31 and/or the first bore sidewall 31B. When the alignment of the insert 20 is good with regard to the bore 31, the first contact rim 41 can first engage the first lip 31L. Due to the chamfer, radius or angled configuration around the lip 31L, that lip 31L can guide the first contact rim 41 into and toward the first bore 31 and into further engagement with the first bore sidewall 31B. Where the first contact rim 41 also includes a chamfer, radiused or angled configuration, that contour can further facilitate guiding of the first contact rim 41 into the first bore 31 toward the first bore sidewall 31B.

When the first contact rim 41 engages the first lip 31L, these components can interact and exchange corresponding forces on one another such that the insert self-centers within the first bore. In so doing, the insert axis BA and the bore axis LA of the body can be aligned. The engagement of the first contact rim 41 of the insert with the first lip 31L and/or the first side wall 31B can be the initial engagement of the insert with the body. This engagement can be the first engagement of and/or first physical contact between the body and any of the components or surfaces of the insert, such as any of the first end 21, the O-ring 50 and the first contact rim 41 of the insert 20. Put another way, the first contact rim 41 is the first part, component or structure of the insert that contacts and/or engages the body, and in particular the first lip 31L, first sidewall 31B and/or the first bore 31. Again, it is this first engagement or first point of contact between the insert and body that self-centers the insert within the first bore so that the insert axis and the bore axis are aligned and/or so that the insert can cleanly be guided into the bore without tilting or misalignment.

It is to be noted that upon this first engagement and/or first point of contact between the insert in the body, that is, between the first contact rim 41 and the first lip 31L, the sidewall 31B and/or the bore 31 itself, the round seal or O-ring 50 maintains a clearance C1, also referred to as a zone of clearance, 360° around the O-ring 50, regardless of whether or not there is some minor misalignment between the insert, its insertion tool and/or the bore of the body, which again can be held in its own fixture. Again, with the first engagement being between this first contact rim and the lip, sidewall and/or bore, this promotes self-centering of the insert. With this self-centering, the O-ring can float safely in space, more particularly in the clearance C1 between the ring and the bore sidewall 31B until after the insert is centered in the body through contact between the insert and more particularly the first contact rim and the first lip, or similar structures. This optionally can remove the function of centering from the O-ring entirely, and can ensure that the O-ring is centered before it is compressed into its final sealing geometry.

Further optionally, as mentioned above, the installation of the insert 20 relative to the body 30 can be performed via a hot insert process. In some applications, the insert 20 can be constructed from metal, such as brass, steel, iron, aluminum or other materials, and the body 30 can be constructed from polymeric material, for example, a thermoplastic and/or a resin material, such as Nylon 6,6. The insert can have a higher melting temperature than the body. The insert can be heated to a temperature optionally above 200° F., above 300° F., above 400° F. or above 500° F. or some other temperature at or above the melting temperature of the body 30. When the insert 20 is so heated, it can be held on its corresponding tool and advanced in directions A1 and A2 as shown in FIGS. 6-7. When the first contact rim 41 engages the first lip 31 and/or the first side wall 31B of the first bore 31, due to the heated condition of the insert, that engagement can result in the portion of the first lip 31L and the first side wall 31B melting when it contacts the first rim contact rim 41. As the insert 21 continues to advance in direction A2 into the bore 31, the heat from the insert can continue to melt the bore sidewall 31B and/or the lip 31L.

Further optionally, as this occurs, the material around those components can melt slightly, becoming molten, and the first contact rim 41 can establish an interference with the sidewall 31B. This can be due to the diameter CD1 of the insert at the first contact rim 41 being greater than the first bore diameter 31D. This diameter CD1 can be greater than the first bore diameter 31D optionally by at least 0.01 mm, at least 0.1 mm, at least 0.25 mm, at least 0.5 mm, at least 0.75 mm, or at least 1 mm, depending on the application. Due to the heat of the heated insert, however, and the lower melting point of the body 30, the material of the body along the sidewall 31B can be melted and conform to the contours of the first exterior 44 of the insert 30 as the insert continues in direction A2. In so doing, the effective diameter 31D of the first bore 31B can slightly increase due to the melting of the material of the bore sidewall 31B. The molten material that engages the contours of first exterior can enter those contours 45 of the insert and eventually cure and fuse to those surfaces.

The insert 20 can be advanced farther into the body as shown in FIG. 8 in direction A3. As this occurs, the first end 21 and the flange 26 enters the second bore 32. The O-ring 50 also can engage the second lip 32L and/or the second sidewall 32B. This can be the first engagement of the O-ring 50 with any of the components of the body 30. This engagement of the seal also can occur after the insert is self-centered in the bore 31, and the insert axis BA is aligned with the bore axis LA. When the O-ring engages the second lip, after the first engagement self-centers the metal insert in the first bore, that O-ring is not damaged by the engagement of itself with the second lip and/or the second bore side wall.

As the O-ring 50 engages the lip and enters the second bore 32, the first contact rim 41 also can continue to engage the first sidewall 31B. Optionally, as the O-ring 50 continues to enter into the second bore 32, the material around the insert in the area of the first exterior 44 can continue to melt and fuse to that first exterior, extending into the contours 45 in the area between the first contact rim 41 and the second end 22.

As shown in FIG. 8, the insert 20 can be further advanced in direction A3 into the body 30. As this occurs, the O-ring 50 can be compressed and can change in cross-section, from a generally circular or slightly elliptical cross-section, to a more elliptical and compressed cross-section. As this occurs, the cross-section of the seal 50 can expand laterally within the recess 25 and can further contact and engage the bottom wall 27 of the recess 25. The major diameter O2 of the seal 50 also can reduce from that diameter to a lesser diameter O3 as the O-ring is compressed within and by the side wall 32B. The compressed O-ring can slide along the second sidewall 32B as it further enters the bore 32, heading toward the lower shoulder 32S of the bore 32. The O-ring 50 can effectively seal against the bore wall, around the insert in general, forming a fluid and/or liquid tight seal between the bore sidewall and the insert. Optionally, where a relief passageway 60 is included, gas RA can escape from the void V to the environment to inhibit the O-ring from being dislodged as described above.

Optionally, where the insert 20 is heated and inserted into the body 30, the second contact rim 42 can melt at least a portion of the second lip 32L and second sidewall 32B when it contacts those components. In some cases, the second lip 32L can be melted or deformed by the heated contact rim 42 before melting the second bore wall 32B. When the second contact rim 42 melts the second bore wall 32B, the first contact rim 41 and/or the first exterior 44 can simultaneously continue melting the first bore wall as those elements slide along and move relative to the first bore wall. As this occurs, the second diameter 32D of the second bore 32 can be slightly increased, again due to the interference of the second contact rim 42 with the lip 32L and/or the second bore wall 32B. All the material that is melted from the second bore wall 32B optionally can enter the contour 43 that is disposed below the first contact rim 41. When this material cures, it can fuse into that groove, recess or contour 43. Likewise, as shown in FIG. 8, when the material inside the first bore 31, along the first bore wall 31B cures, it can fuse and/or bond with the insert and in particular the first exterior 44 in any of the contours 44 defined therein to better secure the insert to the body.

As mentioned above, advancement farther into the body in direction A3 can continue until the insert is satisfactorily installed in the body. In some cases, advancement can be stopped when the first contact rim 41 engages the shoulder and/or second rim 32L. In other cases, the advancement in direction D3 can stop when the first end 21 engages the shoulder 32S. Optionally, the engagement of the first contact rim 41 with the second lip 32L can occur simultaneously as the first end 21 engages the shoulder 32S. In other cases, the insertion advancement can stop when the tool moving the insert 20 is in a preset or predetermined location or orientation relative to the body and/or the fixture that holds the body 30. Other mechanisms are contemplated to stop advancement of the insert at the appropriate depth within the respective bores.

As mentioned above, when the insert is installed in the body, the upper surface 20O of the insert optionally can be flush with the outer surface 31O of the body in that location surrounding the insert. In other applications, it may be inset somewhat relative to the surface 31O, or can protrude slightly from the surface 31O. In yet other applications, there might be a larger flange (not shown) located atop the insert that directly engages the upper surface 31O.

When the insert 20 is fully installed in the body 30, the seal 50 is engaged with the second bore 32. The first end 21 and the flange 26 optionally can be separated around those components by a second clearance C2 so that those components do not engage or contact the second bore wall 32B. This second clearance C2 can have values similar to the values above in connection with the clearance C1. The upper portion of the insert, generally between the first contact rim 41 and the second end 22 can be fused and/or bonded to the material of the body in that location when cooled. This can optionally support and rigidity and securement of the insert to the body to impair pullout or mobile there from.

Optionally, where the insert 20 includes threads 20T, after the insert is fully installed, a second part 102 having a male threaded portion 102T can be moved in direction A4 toward the insert 20 and installed in the bore 20B of the insert. The part 102 can be rotated in direction RP so that the threads 102T engage the threads 20T to install the part 102 relative to the insert 20 and thus the body 30 and any assembly to which the body is secured. Alternatively, with a different or opposite thread configuration, the part can be rotated in an opposite direction to install the part. As shown, the part 102 optionally can include a secondary seal 102S which can be in the form of another O-ring. The secondary seal can engage the outer surface 22O of the insert and form a fluid tight seal in that location. Further optionally, the insert can include a tapered thread, such as an NPT thread, to perform a sealing function between the first passageway and the part. Other threads, connections and/or sealing configurations are contemplated between the part and the insert, depending on the application.

After the part is installed, a fluid, such as a liquid, for example oil, can flow through the first passageway 20P, second passageway 30P as well as the second part 102. In some applications, where the body 30 is part of an oil filter assembly, and the second part 102 is a sensor, such as an oil pressure and/or oil temperature sensor, the oil can flow between the sensor 102 and the body 30, through the respective first passageway 20P and second passageway 30P. Of course in other applications, other fluids can flow through the insert, body and the respective passageways.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of assembling an insert relative to a body, the method comprising:
    providing a body defining a first bore bounded by a first lip, the first bore including a first bore diameter and a bore axis;
    providing an insert defining an insert bore, a first end, a first contact rim and a second end distal from the first end, the insert bore extending through the insert from the first end to the second end to define a passageway through the insert, the insert encircled by an elastomeric O-ring having an O-ring major diameter, the O-ring located between the first end and the first contact rim, the insert including an insert axis;
    advancing the insert into the first bore so that the first end enters the first bore passing the first lip without contacting the first lip with a first clearance defined around the first end as the first end passes the first lip;
    advancing the insert into the first bore farther so that the elastomeric O-ring enters the first bore passing the first lip without contacting the first lip, with a second clearance defined around the O-ring as the O-ring moves within the first bore;
    advancing the insert into the first bore farther so that the first contact rim engages at least one of the first lip and the first bore; and
    fusing at least a portion of the body to the insert between the first end and the second end to secure the insert to the body,
    wherein the engagement of the first contact rim with at least one of the first lip and the first bore is the first engagement of at least one of the first lip and the first bore with any of the first end, O-ring and first contact rim of the insert, wherein the first engagement self-centers the insert within the first bore so that the insert axis and the bore axis are aligned.

2. The method of claim 1 comprising:
advancing the insert into the first bore farther so that the elastomeric O-ring contacts a bore wall inside the body, such that the O-ring seals against the bore wall around the O-ring.

3. The method of claim 1 comprising:
advancing the insert into the first bore farther so that the elastomeric O-ring enters a second bore that is contiguous with the first bore, the second bore having a second bore diameter,
wherein the second bore diameter is less than the O-ring major diameter,
wherein the O-ring seals against a bore wall of the second bore.

4. The method of claim 3,
wherein the second bore diameter is less than the first bore diameter,
wherein the bore wall forms a cylindrical tube around the second bore.

5. The method of claim 4,
wherein the O-ring contacts and slides along the bore wall of the second bore.

6. The method of claim 1,
wherein the body defines a second bore having a second bore diameter that is less than the first bore diameter,
wherein the second bore transitions to the first bore at a second lip,
wherein the O-ring contacts the second lip but not the first bore when the O-ring is advanced far enough into the body.

7. The method of claim 1,
wherein the body defines a second bore having a second bore diameter that is less than the first bore diameter,
wherein the second bore transitions to the first bore at a second lip,
wherein the O-ring engages the second lip after the first engagement self-centers the insert within the first bore,
whereby the O-ring is not damaged by the engagement of the O-ring with the second lip.

8. The method of claim 7,
wherein the insert includes a second contact rim between the O-ring and the first contact rim,
wherein the second contact rim engages the second lip after the O-ring engages the second lip as the insert is advanced farther in the first bore.

9. The method of claim 1,
wherein the O-ring engages a bore wall within the body after the first engagement self-centers the insert within the first bore,
whereby the O-ring is not damaged by the engagement of the O-ring with the bore wall.

10. A method of assembling an insert relative to a body, the method comprising:
providing a body defining a first bore bounded by a first lip, the first bore including a first bore diameter and a bore axis;
providing an insert defining an insert bore, a first end, a first contact rim and a second end distal from the first end, the insert bore extending through the insert from the first end to the second end to define a passageway through the insert, the insert encircled by an elastomeric O-ring having an O-ring major diameter, the O-ring located between the first end and the first contact rim, the insert including an insert axis;
advancing the insert into the first bore so that the first end enters the first bore passing the first lip without contacting the first lip with a first clearance defined around the first end as the first end passes the first lip;
advancing the insert into the first bore farther so that the elastomeric O-ring enters the first bore passing the first lip without contacting the first lip, with a second clearance defined around the O-ring as the O-ring moves within the first bore;
advancing the insert into the first bore farther so that the first contact rim engages at least one of the first lip and the first bore; and
heating the insert to at least 200° F.,
wherein the engagement of the first contact rim with at least one of the first lip and the first bore is the first engagement of at least one of the first lip and the first bore with any of the first end, O-ring and first contact rim of the insert,
wherein the first engagement self-centers the insert within the first bore so that the insert axis and the bore axis are aligned,
wherein the first contact rim melts a bore wall near the first lip so that the first bore diameter increases where the first contact rim melts the bore wall.

11. The method of claim 10,
wherein a second contact rim between the first contact rim and the O-ring melts another bore wall near a second bore diameter so that the second bore diameter increases where the second contact rim melts the other bore wall.

12. The method of claim 11,
wherein the first bore diameter and second bore diameter are separated by a second lip,
wherein the second contact rim melts the second lip before melting the other bore wall.

13. A method of assembling an insert relative to a body, the method comprising:
providing a body defining a first bore bounded by a first lip, the first bore including a first bore diameter;
providing an insert defining an insert bore, a first end, a first contact rim and a second end distal from the first end, the insert bore extending through the insert from the first end to the second end to define a passageway through the insert, the insert encircled by an O-ring located between the first end and the first contact rim;
advancing the insert into the first bore so that the O-ring enters the first bore passing the first lip without contacting the first lip, with a second clearance defined around the O-ring as the O-ring moves within the first bore;
advancing the insert into the first bore farther so that the first contact rim engages at least one of the first lip and the first bore; and
fusing at least a portion of the body to the insert between the first end and the second end to secure the insert to the body,
wherein the engagement of the first contact rim with at least one of the first lip and the first bore is the first engagement of at least one of the first lip and the first bore with any part of the insert, including the O-ring,
wherein the first engagement self-centers the insert within the first bore.

14. The method of claim 13 comprising:
advancing the insert into the first bore farther so that the O-ring contacts a bore wall inside the body, such that the O-ring seals against the bore wall around the O-ring.

15. The method of claim 13 comprising:
advancing the insert into the first bore farther so that the O-ring enters a second bore that is contiguous with the first bore, the second bore having a second bore diameter less than the first bore diameter,
wherein the O-ring seals against a bore wall of the second bore.

16. A method of assembling an insert relative to a body, the method comprising:
providing a body defining a first bore bounded by a first lip, the first bore including a first bore diameter;
providing an insert defining an insert bore, a first end, a first contact rim and a second end distal from the first end, the insert bore extending through the insert from the first end to the second end to define a passageway through the insert, the insert encircled by an O-ring located between the first end and the first contact rim;
advancing the insert into the first bore so that the O-ring enters the first bore passing the first lip without contacting the first lip, with a second clearance defined around the O-ring as the O-ring moves within the first bore;
advancing the insert into the first bore farther so that the first contact rim engages at least one of the first lip and the first bore; and
heating the insert to at least 200° F.,
wherein the engagement of the first contact rim with at least one of the first lip and the first bore is the first engagement of at least one of the first lip and the first bore with any part of the insert, including the O-ring,
wherein the first engagement self-centers the insert within the first bore,
wherein the first contact rim melts a bore wall near the first lip so that the first bore diameter increases where the first contact rim melts the bore wall.

17. A sealed system configured to convey fluid, the system comprising:
an insert defining an insert bore, a first end, a first contact rim, a second contact rim distal from the first contact rim, and a second end distal from the first end, the insert bore extending through the insert from the first end to the second end to define a first passageway through the insert, the insert encircled by an elastomeric O-ring having an O-ring major diameter, the O-ring located between the first end and the second contact rim, the insert including an insert axis; and
a body defining a first bore bounded by a first lip, the first bore including a first bore diameter and a bore axis, the body defining a second bore diameter distal from the first bore diameter, the second bore diameter less than the first bore diameter and less than the O-ring major diameter, the body including a second passageway,
wherein the insert is installed in the body such that the first passageway is in fluid communication with the second passageway,
wherein the insert is installed in the body such that the O-ring engages a second bore wall at the second bore diameter to form a seal between the second bore wall and the insert,
wherein the insert is installed in the body such that the first end is adjacent the second bore wall, but separated by a clearance from the second bore wall,
wherein the insert is self-centered within the first bore so that the insert axis and the bore axis are aligned,
wherein the body is fused to the insert such that the insert and body are secured together.

18. The system of claim 17 comprising:
a second lip of the body disposed closer to the first end than the first bore diameter;
wherein the first contact rim is adjacent the second lip of the body.

19. A sealed system configured to convey fluid, the system comprising:
an insert defining an insert bore, a first end, a first contact rim, a second contact rim distal from the first contact rim, and a second end distal from the first end, the insert bore extending through the insert from the first end to the second end to define a first passageway through the insert, the insert encircled by an elastomeric O-ring having an O-ring major diameter, the O-ring located between the first end and the second contact rim, the insert including an insert axis;
a body defining a first bore bounded by a first lip, the first bore including a first bore diameter and a bore axis, the body defining a second bore diameter distal from the first bore diameter, the second bore diameter less than the first bore diameter and less than the O-ring major diameter, the body including a second passageway; and
a first exterior surface extending between the first contact rim and the second end,
wherein the insert is installed in the body such that the first passageway is in fluid communication with the second passageway,
wherein the insert is installed in the body such that the O-ring engages a second bore wall at the second bore diameter to form a seal between the second bore wall and the insert,
wherein the insert is installed in the body such that the first end is adjacent the second bore wall, but separated by a clearance from the second bore wall,
wherein the insert is self-centered within the first bore so that the insert axis and the bore axis are aligned,
wherein the first bore is melted and fused to the first exterior surface.

20. A sealed system configured to convey fluid, the system comprising:
an insert defining an insert bore, a first end, a first contact rim, a second contact rim distal from the first contact rim, and a second end distal from the first end, the insert bore extending through the insert from the first end to the second end to define a first passageway through the insert, the insert encircled by a single elastomeric O-ring having an O-ring major diameter, the single O-ring located between the first end and the second contact rim, the insert including an insert axis; and
a body defining a first bore bounded by a first lip, the first bore including a first bore diameter and a bore axis, the body defining a second bore diameter distal from the first bore diameter, the second bore diameter less than the first bore diameter and less than the O-ring major diameter, the body including a second passageway,
wherein the insert is installed in the body such that the first passageway is in fluid communication with the second passageway,
wherein the insert is installed in the body such that the single O-ring engages a second bore wall at the second bore diameter to form a seal between the second bore wall and the insert,
wherein the insert is installed in the body such that the first end is adjacent the second bore wall, but separated by a clearance from the second bore wall,
wherein the insert is self-centered within the first bore so that the insert axis and the bore axis are aligned, wherein the single O-ring is the only O-ring disposed between the body and the insert to provide a seal therebetween.

\* \* \* \* \*